(12) United States Patent
Alric et al.

(10) Patent No.: US 8,257,085 B2
(45) Date of Patent: Sep. 4, 2012

(54) DEVICE FOR SIMULATING A STOMACH OF A MONOGASTRIC MAMMAL OR OF A HUMAN BEING

(75) Inventors: Monique Alric, Saint Flour l'etang (FR); Sylvain Georges Jean Denis, Clermont-Ferrand (FR)

(73) Assignee: Universite d'Auvergne Clermont I, Clermont-Ferrand (FR)

( * ) Notice: Subject to any disclaimer, the term of this patent is extended or adjusted under 35 U.S.C. 154(b) by 184 days.

(21) Appl. No.: 12/740,448

(22) PCT Filed: Oct. 21, 2008

(86) PCT No.: PCT/FR2008/001474
§ 371 (c)(1),
(2), (4) Date: Sep. 16, 2010

(87) PCT Pub. No.: WO2009/087314
PCT Pub. Date: Jul. 16, 2009

(65) Prior Publication Data
US 2011/0020780 A1    Jan. 27, 2011

(30) Foreign Application Priority Data
Oct. 30, 2007  (FR) ...................................... 07 07631

(51) Int. Cl.
*G09B 19/00* (2006.01)
*G09B 23/28* (2006.01)
(52) U.S. Cl. ........................................ 434/127; 434/272
(58) Field of Classification Search .................. 434/127, 434/262, 267, 268, 272
See application file for complete search history.

(56) References Cited

U.S. PATENT DOCUMENTS

| | | | |
|---|---|---|---|
| 3,748,366 A | 7/1973 | Rader et al. | |
| 5,525,305 A | 6/1996 | Minekus et al. | |
| 5,993,406 A * | 11/1999 | Rozga et al. | 604/6.09 |
| 6,022,733 A * | 2/2000 | Tam et al. | 435/287.1 |
| 6,379,619 B1 * | 4/2002 | Rozga et al. | 422/48 |
| 8,092,222 B2 * | 1/2012 | Wickham et al. | 434/127 |
| 2008/0206728 A1 | 8/2008 | Wickham et al. | |

FOREIGN PATENT DOCUMENTS

DE    40 42 298    7/1992

OTHER PUBLICATIONS

International Search Report for PCT/FR2008/001474.

* cited by examiner

*Primary Examiner* — Kurt Fernstrom
(74) *Attorney, Agent, or Firm* — B. Aaron Schulman, Esq.; Stites & Harbison PLLC

(57) ABSTRACT

The invention relates to a device for simulating the stomach of a monogastric mammal or of a human being that includes at least two compression chambers ($C_2$, $C_3$) connected together by an intermediate chamber. Each compression chamber ($C_2$, $C_3$) includes a piston ($7_2$, $7_3$) adapted for urging the content of a compression chamber ($C_2$, $C_3$) towards the other compression chamber ($C_2$, $C_3$). The device includes means (20) capable of generating turbulent flow of the device content when passing through the intermediate chamber ($C_8$). The intermediate chamber ($C_8$) is formed in an intermediate block (8) provided with an access means (11a, 12, 16) for supplying products (12) and/or tapping the content of the device at any moment of the operation cycle thereof.

12 Claims, 5 Drawing Sheets

Figure 1:
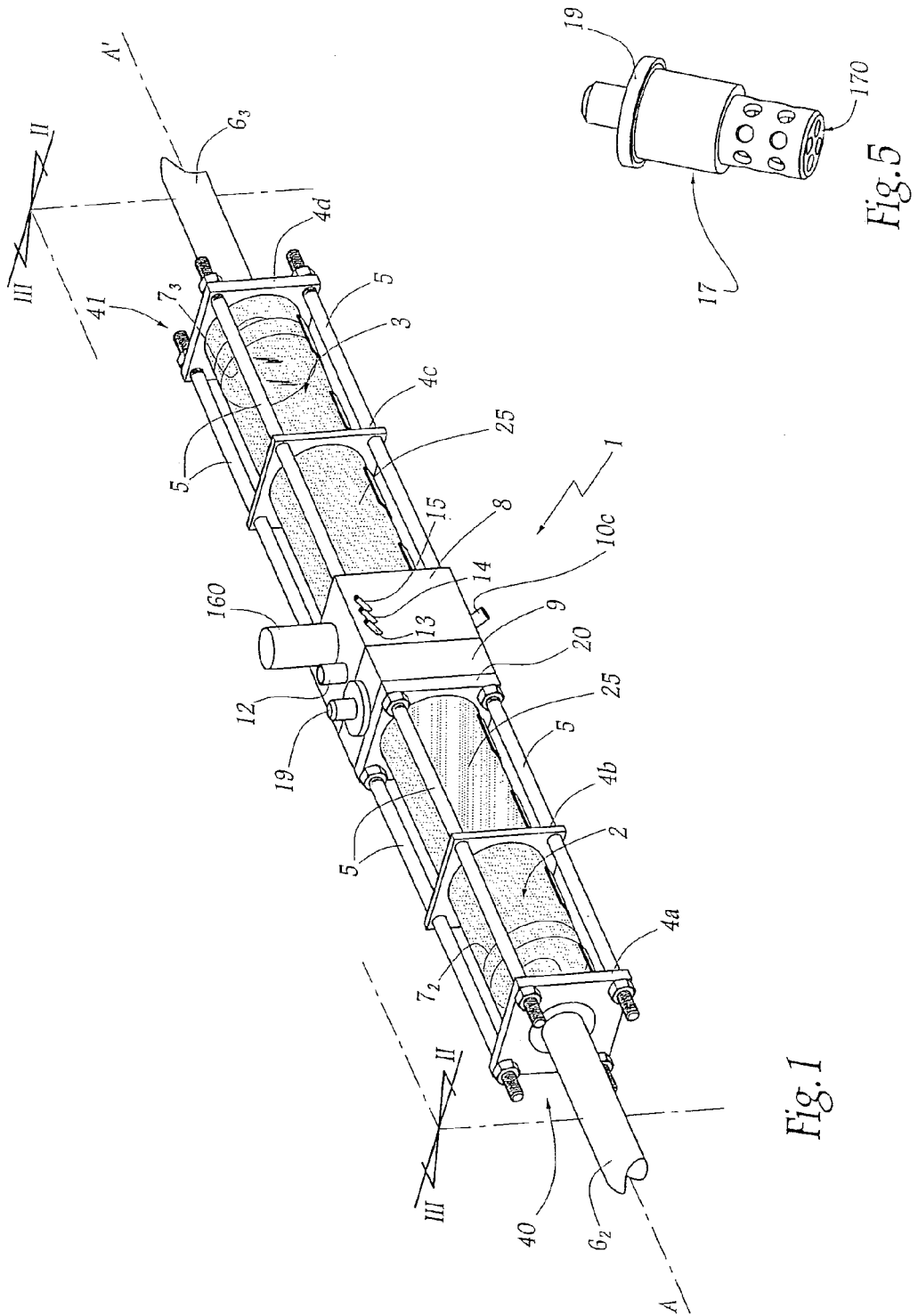

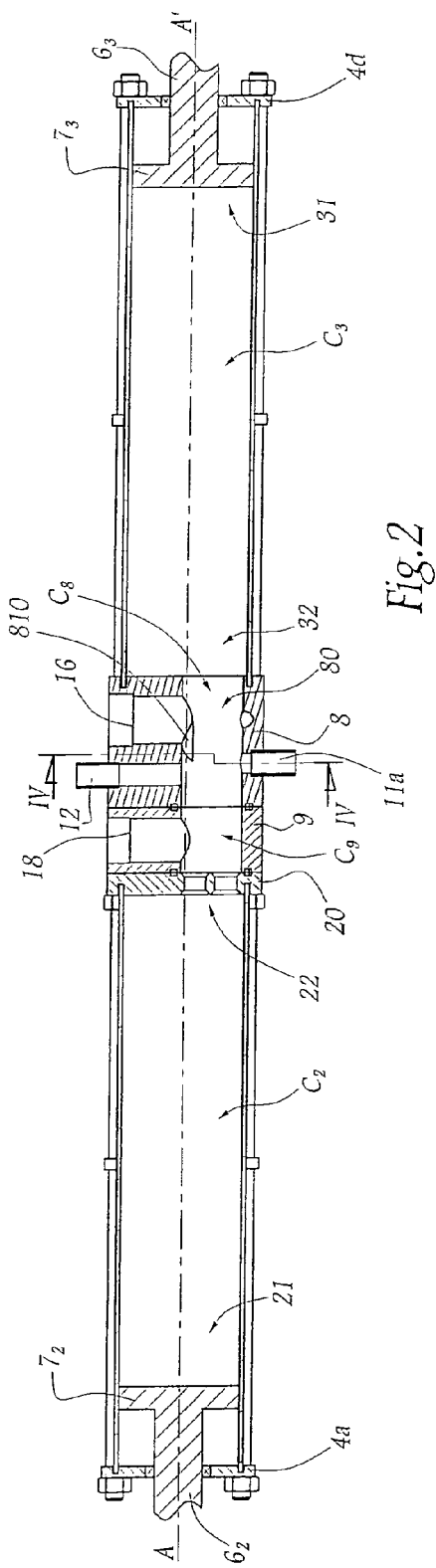
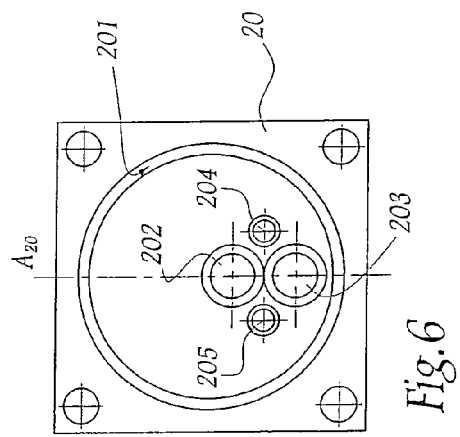
Fig.2
Fig.4
Fig.6

DEVICE FOR SIMULATING A STOMACH OF A MONOGASTRIC MAMMAL OR OF A HUMAN BEING

This application is based on and claims priority under 35 USC 119 from French Patent Application No. 2008/001474, filed on Oct. 21, 2008.

The invention relates to a device for simulating a stomach of a monogastric mammal or of a human being.

Such a device makes it possible to study, in vitro, the digestion of food and the behavior of certain substances that are ingested or that might be ingested, e.g. food supplements, xenobiotics, pathogenic agents or drugs. Studies conducted using such a device make it possible to assess the effects that the conditions prevailing in the stomach have on such substances, e.g. the time taken by a solid compound to be broken down into particles that are small enough to continue on the way into the intestine, the release kinetics of active compounds, the interactions between various substances subjected to the gastric environment, and/or the survival of micro-organisms.

In order to be representative of the gastric environment, such a device must have certain characteristics and must perform several functions. The device should have a working volume adapted to ensure that the gastric digestion phenomena are simulated effectively.

The device must keep the contents at a temperature lying in the range 35° C. to 45° C., with the pH of said contents varying approximately in the range 1 to 8.

At any time during normal operation of the device, it must be possible to feed it and to inject into it substances that are similar to those secreted into the stomach by a monogastric mammal or a human being in response to ingestion of a food bolus.

Such a device must simulate the gastric tone, i.e. it must ensure that the liquid and/or solid contents of the device are mixed and broken down non-aggressively. It must also reproduce gastric transit. Such transit comprises filling the device, with the arrival of the food bolus being monitored, a period during which the bolus dwells in the device, and emptying the gastric contents towards the small intestine in controlled and differentiated manner depending on the size of the particles of the contents of device, the liquid components being removed first. The term "liquid components" is used to mean either water, or solutions, filled or otherwise, the fillers of the solutions comprising "fine" particles of diameter less than about 5 millimeters (mm). The term "solid components" is used to mean any particle of diameter greater than about 5 mm.

Naturally all these variables can be set as a function of the simulated mammal or human being and/or as a function of the physiological or pathological conditions to be reproduced.

WO-A-94/09895 discloses a device having two compression chambers interconnected via an intermediate chamber. Each of the compression chambers houses a flexible closed pouch. A fluid injected into each chamber in alternation, into the space provided between the inside wall of the compression chamber and the outside wall of the flexible pouch, makes it possible to compress the pouches selectively. Those movements in alternation for compressing and for relaxing each pouch are supposed to reproduce the contractions of the stomach. Unfortunately, in such a device, the compression and relaxation of the pouches does not guarantee optimum mixing of the food bolus with the substances simulating the gastric secretions. Dead zones exist in which gastric digestion is not simulated satisfactorily.

In addition, the device described in WO-A-94/09895 cannot operate discontinuously, i.e. initial filling takes place on a single occasion, at the beginning of the cycle. Such operation is not true to physiological reality because arrival of the food bolus in the stomach is progressive and lasts for the time a meal lasts.

WO-A-2007/010238 describes a device for simulating gastric digestion that comprises two portions, each of which reproduces a respective zone of the stomach. That device has a conical upper portion that is flexible and that is connected to a rigid lower portion. The lower portion is made up of two concentric cylinders, the inner cylinder receiving a piston. The food bolus goes from the top portion to the bottom portion via a passage provided with a check valve. The food bolus fills the volume inside the inner cylinder that is vacated by moving the piston. The inner cylinder then moves downwards while the piston simultaneously moves upwards. Thus, the food bolus is forced through an opening in the inner cylinder into the lumen of the outer cylinder. This makes it possible to break down the particles. Although such a device simulates the physiology of the various portions of the stomach, it is does not make it possible to inject substances and/or to effect selective tapping during the cycle. In addition, in the upper portion, the food bolus is not mixed homogeneously, which means that taking samples that are representative of the bolus, and also making the experiments reproducible are both difficult.

In addition, when the stomach is emptying naturally, the particles are removed into the intestine as a function of their size, which is not possible with the devices described in WO-A-94/09895 and WO-A-2007/010238.

Finally, the devices described in WO-A-94/09895 and WO-A-2007/010238 do not make it easy to manage and to monitor injection and/or removal of substances, e.g. substances for testing, at precise moments in the simulated digestion.

An object of the invention is, more particularly, to remedy those drawbacks by proposing a device for simulating a stomach that does not have any dead zones, that is representative of the overall operation of a stomach of a monogastric mammal or of a human being, that makes it possible to inject substances and/or to effect controlled tapping during digestion, and that guarantees homogeneous mixing of the contents of the device.

To this end, the invention provides a device for simulating a stomach of a monogastric mammal or of a human being, which device comprises at least two compression chambers that are connected together via an intermediate chamber, said device being characterized in that each compression chamber has a piston adapted to push the contents of one compression chamber towards the other compression chamber, and in that it further comprises means suitable for causing the contents of the device to flow in a turbulent flow on passing through an intermediate chamber provided in an intermediate unit equipped with at least one access means giving access to the intermediate chamber and making it possible for substances to be fed into the device and/or to be tapped therefrom at any time during the operating cycle of the device.

Such a device makes it possible to procure effective stirring and homogenization of the contents of the device simulating the contents of a stomach. Due to the presence of a piston in each compression chamber, such a device does not have any dead zone.

Due to the presence of means of giving access to the intermediate chamber, the device is fed and/or tapped in progressive and independent manner.

In advantageous but non-essential aspects of the invention, the device may incorporate one or more of the following characteristics:

each piston is mounted to move in a direction parallel to a longitudinal axis that is common to the two compression chambers and forms a moving end-wall for each chamber.

The intermediate chamber comprises two cavities of different shapes and dimensions.

A first cavity is cylindrical and of circular cross-section, and a second cavity is L-shaped, one branch of the L-shape being connected to the first cavity and the other branch not opening out into the compression chambers when the device is operating normally.

The means suitable for causing the turbulent flow comprise at least one closure flange plate mounted between one end of a compression chamber and one end of the intermediate chamber.

The flange plate is provided with at least one calibrated orifice for passing the contents of the device from a compression chamber to the intermediate chamber and vice versa.

The closure flange plate is disposed in a manner such that its orifices are in register with a cylindrical cavity of the intermediate chamber.

The intermediate unit is provided with an access orifice enabling a pH and/or temperature probe to be inserted into the intermediate chamber.

The intermediate unit is provided with an access orifice enabling a pressure sensor to be inserted into the intermediate chamber.

An additional unit defining an additional chamber suitable for receiving a substance for testing in the device is interposed between the flange plate and the intermediate unit.

The additional unit defining the additional chamber is interposed removably between the flange plate and the intermediate unit.

The additional unit is provided with an orifice suitable for receiving an accessory designed to contain a substance for testing.

Figure 3:
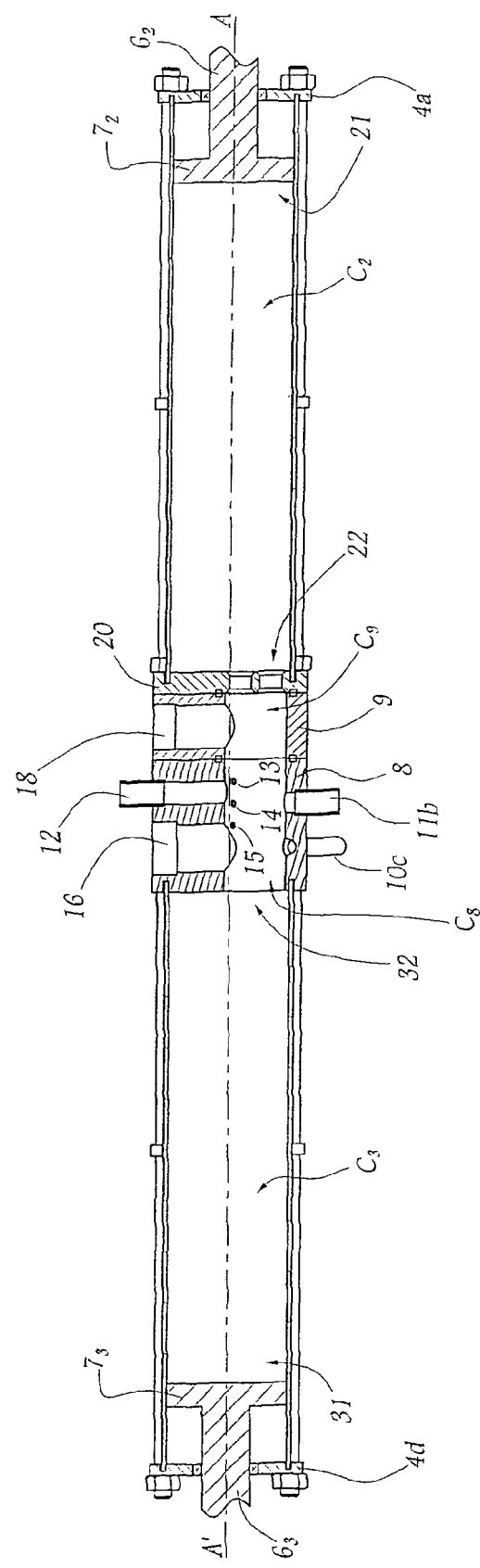
Figure 7:
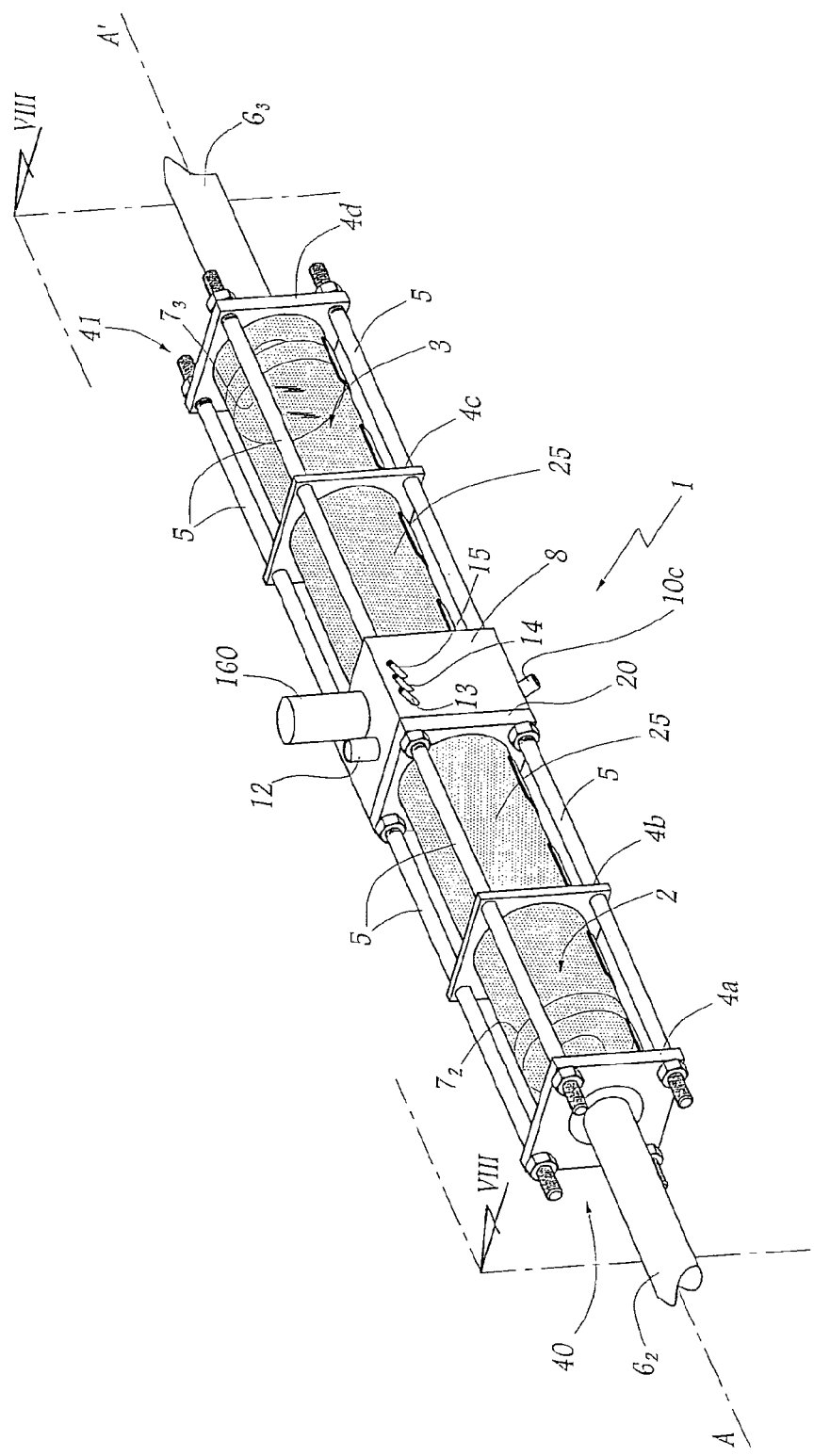
Figure 8:
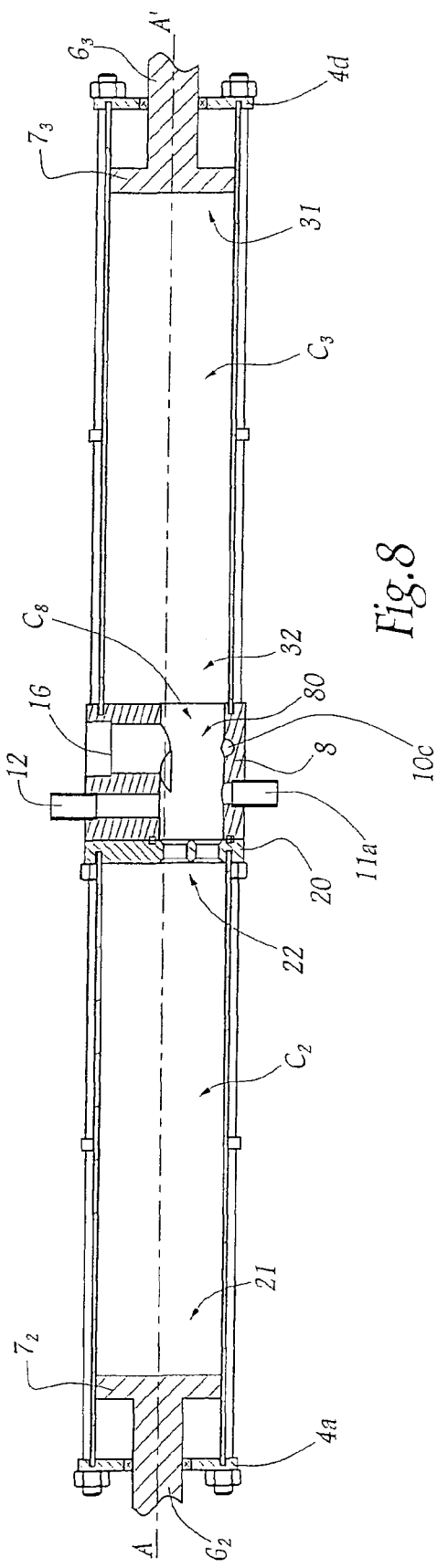

The invention can be better understood and other advantages thereof appear more clearly on reading the following description of two embodiments of a device of the invention, given merely by way of example and with reference to the accompanying drawings, in which:

FIG. 1 is a simplified perspective view of a first embodiment of a device of the invention, as equipped with an additional unit, FIGS. 2 and 3 are longitudinal section views of the device of FIG. 1 respectively seen looking along arrows II-II and III-III, FIG. 4 is a section view on line IV-IV of FIG. 2, FIG. 5 is a perspective view on a larger scale of an accessory designed to contain a substance, in the device of FIGS. 1 to 3, FIG. 6 is a face-on view, on a larger scale than FIGS. 1 to 3, showing a closure flange plate situated between a compression chamber and an additional unit of the device shown in FIGS. 1 to 3, FIG. 7 is a view similar to FIG. 1, showing a second embodiment of the device, in which embodiment the device is not equipped with an additional unit and FIG. 8 is a longitudinal section view of the device of FIG. 7 seen looking along arrows VIII-VIII.

The device 1, shown in FIGS. 1, 2, 3, 7, and 8 comprises two compression chambers $C_2$, $C_3$. These chambers are defined by tubular sleeves 2 and 3 that are of cylindrical section and that, advantageously over at least a portion of each of them, are made of a material that is transparent, chemically and biologically neutral, and easy to sterilize, e.g. of glass or of polymethacrylate. Such a transparent material makes it possible to monitor the contents of the chambers $C_2$ and $C_3$ visually.

The sleeves 2 and 3 are inserted into orifices of corresponding shapes provided in square plates 4a, 4b, 4c, 4d. In the embodiment shown in FIG. 7, rods 5 connect the corners of the plates 4 to an intermediate or "main" unit 8 that is substantially in the shape of a cube and that defines an intermediate or "main" chamber $C_8$. The plates 4a to 4d and the rods 5 thus form a frame for holding and protecting the sleeves 2, 3.

At each end 40, 41 of the frame, a respective end plate 4a, 4d is provided with a central orifice for passing an actuator $6_2$, $6_3$. Each actuator $6_2$, $6_3$ passes through the corresponding plate in leaktight manner, the insides of the chambers $C_2$, $C_3$ remaining isolated from the outsides. The actuators $6_2$, $6_3$ are advantageously of the hydraulic type or of the electric type.

Each actuator $6_2$, $6_3$ moves a respective piston $7_2$, $7_3$. Each piston is mounted to move in a direction parallel to a longitudinal axis A-A' that is common to the chambers $C_2$, $C_3$. Each piston $7_2$, $7_3$ forms a moving end or end-wall $7_2$, $7_3$ for the chamber $C_2$, $C_3$ in which it is installed. The plates 4a to 4d, the pistons $7_2$, $7_3$, and the actuators $6_2$, $6_3$, advantageously as well as other component parts of the device 1, are made of a rigid material that is chemically and biologically neutral, and that is easy to sterilize.

The stroke of each piston $7_2$, $7_3$ is adapted so that said piston moves, in each chamber $C_2$, $C_3$, respectively from one end 21, 31 of the chamber $C_2$, $C_3$ that is close to a plate 4a, 4d towards the other end 22, 32 that is close to the unit 8, and vice versa.

Each piston $7_2$, $7_3$ travels over its stroke while preserving the leaktightness in each compression chamber $C_2$, $C_3$.

In an embodiment (not shown), each piston $7_2$, $7_3$ can move independently of the other at a speed and at a frequency that are adjustable.

The compression chambers $C_2$, $C_3$ are connected at their ends 22 and 32 to the main chamber $C_8$. In the embodiment shown in FIGS. 7 and 8, the end 22 of the chamber $C_2$ is adapted to enable the contents of the chamber $C_2$ to pass into the main chamber $C_8$.

Said end 22 is defined by a closure plate or flange plate 20. The flange plate 20, shown in a face-on view in FIG. 6, receives the end of the sleeve 2 in a circular groove 201. When it is at the end of its stroke, the piston $7_2$ is in abutment against the flange plate 20. The closure flange plate 20 is provided with four through circular holes 202, 203, 204, 205 that make it possible for the contents of the chamber $C_2$ to pass through to or from the main chamber $C_8$. In a variant, the number of through orifices in the flange plate 20 is different from four, while being greater than or equal to one.

The orifices 202 to 205 are disposed in the vicinity of one edge of the flange plate 20. Two orifices 202, 203 of diameter in the vicinity of 10 mm are disposed one above the other. Two orifices 204, 205 of smaller diameter, in the vicinity of 5 mm, are disposed on either side of a vertical straight line $A_{20}$ passing through the centers of the orifices 202 and 203. Such a configuration and such a difference in cross-section between the orifices 202 to 205 generate preferred passages for the various components of the contents of the device through said orifices.

A distinction is made between solid components containing particles of size greater than 5 mm and liquid components containing fluids and "fine" particles of size smaller than 5 mm. The liquid components can pass through all of the orifices 202 to 205, whereas the solid components can pass through the orifices 202 and 203 of larger cross-section only. Thus, different flows of the components are caused to occur between the chambers $C_2$ and $C_8$, depending on which orifices 202 to 205 the components go through. The same applies when the mixture goes from the chamber $C_3$ to the chamber $C_2$ via the chamber $C_8$. The configuration of the orifices 202 to 205 and the different diameters of the orifices 202 to 205 facilitate generation of a turbulent flow making it possible for the contents of the device 1 to be mixed homogeneously on going from one chamber $C_2$, $C_3$ to the other via the flange plate 20. In addition, the orifices 202 to 205 of the flange plate 20 have a mechanical action on the particles, while the flow is passing between the chambers $C_2$ and $C_8$. This mechanical action makes it possible to reduce the particle size of the initial contents of the device, such contents simulating a food bolus arriving in the stomach.

The working volume of the main chamber $C_8$ is subdivided into two cavities 80, 81. As shown in FIG. 4, the cavities 80, 81 are of different shapes and of different dimensions.

The first cavity 80 is cylindrical and of circular cross-section. The diameter and the position of the cavity 80 are adapted so that, at one of its ends, said cavity faces all of the orifices 202 to 205 in the flange plate 20, and, at its other end, said cavity faces the compression chamber $C_3$, in the embodiment shown in FIGS. 7 and 8.

At one of its ends, the cavity 80 faces the compression chamber $C_3$ and, at its other end, faces an additional chamber $C_9$, in the embodiment shown in FIGS. 1 to 3.

The second cavity 81 is configured in an L-shape, one branch 810 of which is connected to the cavity 80. The cross-section of the branch 810 is such that the components, essentially the liquid components, penetrate into this branch and thus go from the cavity 80 to a branch 811. The other branch 811 of the cavity 81 is closed at its free end 10a, in the normal configuration of use of the device 1. The volume of the cavity 81 is smaller than the volume of the cavity 80. The second cavity 81 faces neither the orifices 202 to 205 of the flange plate 20 nor the compression chamber $C_3$. The branch 811 thus defines an isolated temporary storage zone for temporarily storing the contents of the device 1, in particular for temporarily storing the liquid components. The solid components are received in the cavity 80, as are the liquid components, during a normal operating cycle of the device.

As shown in FIG. 4, the low portions of the cavities 81, 80 are connected to respective ones of outlet orifices 10a, 10b that are themselves connected to respective ones of end-pieces 11a, 11b that are closed in the normal configuration of use of the device 1. Said end-pieces 11a, 11b can be connected to devices for removing or tapping the contents of the device 1. For example, such devices are peristaltic pumps.

The cavity 81 is connected to the end-piece 11a at the free end of the branch 811. During a digestion simulation cycle, the orifices 10a, 10b are normally closed. They are opened only when necessary, in order to perform tapping from one or the other of the cavities 81, 80. Thus, it is possible to tap liquid components of the contents of the device selectively by opening the orifice 10a only. Opening the orifice 10b makes it possible to tap solid and liquid components equally well. In this way, gastric emptying of a human being or of a monogastric mammal is reproduced in controlled and more representative manner.

An outlet 10c that can be seen in FIG. 3 is provided in the vicinity of the orifice 10b. This outlet 10c opens out at the bottom of the cavity 80. It is closed in the normal-use configuration. The outlet 10c makes it possible to take samples of the contents of the device. If necessary, this outlet 10c also makes it possible for the device 1 to be emptied totally and rapidly.

In an embodiment (not shown), the end-pieces 11a, 11b can be connected to a device simulating the behavior of the small intestine. Such a device can, for example, have a series of receptacles reproducing the various portions of the small intestine, namely the duodenum, the jejunum, and the ileum. These receptacles, e.g. of conical shape, are provided with stirrer, heater, and pH-monitor means. They are also equipped with controlled feed means for controlled feeding-in of substances such as solutions reproducing pancreatic and bilious secretions, water, sodium bicarbonate, or other substances. A de-oxygenation system, operating by injecting gaseous nitrogen into the receptacles, is also provided. Pumps interconnect the receptacles, tapping taking place at the bottom of the receptacle and feed taking place at the top. Selective injection means for selectively injecting substances for testing may be provided on one or more of the receptacles. The conical shape of the receptacles makes it possible to optimize the mixing, regardless of the volume of the contents present in the receptacles. The receptacles are thus disposed in cascade at the outlet of the device 1.

It is possible to make provision to servo-control the receptacles that simulate a small intestine and the device 1 that simulates a stomach. In which case, modifying at least one parameter relating to operation of a receptacle from among the receptacles simulating the small intestine influences the parameters relating to operation of the other receptacles. Similarly, modifying at least one parameter of the device 1 can influence at least one parameter of the device for simulating the small intestine, and vice versa.

In a variant, the device simulating the behavior of the small intestine may comprise a series of adapted devices 1.

In its top portion, the main unit 8 is equipped with an orifice 12 for injecting the food bolus into the chamber $C_8$. Said bolus is prepared separately, and it can come from a device for simulating gastric filling. Such a device is adapted to optimize the time and the area of contact between the ingredients of the food bolus and saliva, or a solution reproducing saliva. It is also possible to inject the components of the food bolus, namely foods and water, directly through the orifice 12.

Inlet connector tubes 13, 14, and 15 mounted on the unit 8 open out laterally at the top of the chamber $C_8$, at the cavity 80. They enable substances involved in digestion, e.g. substances making it possible to break foods down, such as hydrochloric acid, gastric enzymes such as pepsin or lipase, or other substances involved in the digestion process, to be injected in desired quantities at any time in the digestion simulation cycle.

Another orifice 16, situated at the top of the unit 8, in the vicinity of the orifice 12, makes it possible to insert a pH and/or temperature probe 160, visible in FIGS. 1 and 7, into the cavity 80 in order to measure and monitor these parameters during the operating cycle of the device.

Another orifice 16a situated in the unit 8, at the branch 811 and visible in FIG. 4, makes it possible to insert a pressure sensor (not shown) that measures and monitors the pressure inside the device 1 during the digestion cycle. Measuring the pressure makes it possible to adapt the movement of the actuators, while also avoiding excessive pressure inside the device 1. For this purpose, the pressure sensor is advantageously connected to an emergency stop member for stopping the actuators in an emergency.

Other orifices may be provided in the unit 8 or in the intermediate units disposed between the unit 8 and a compression chamber $C_2$, $C_3$ for the purpose of intalling other sensors, if necessary. It is also possible to equip the unit 8 with a gas removal valve adapted to make it possible to draw off any gas present inside the device 1. Such a valve also makes it possible to maintain a controlled pressure inside the device 1.

When it is desired to inject substances for testing into the device 1, an additional or "pharmaceutical" chamber $C_9$ is used that is interposed between the flange plate 20 and the main unit 8, i.e. between the chambers $C_2$, $C_8$ as shown in FIGS. 1 to 3.

The chamber $C_9$ is provided in an additional unit 9 that is substantially parallelepipedic block shaped in this example. The chamber $C_9$ is cylindrical and of circular section that is identical to the circular section of the main chamber $C_8$. Such a configuration makes it possible for the contents of the device to pass freely between the two chambers $C_8$ and $C_9$.

An orifice 18 provided at the top of the unit 9 is adapted to receive an accessory 17. This accessory, mounted removably or otherwise, is adapted to receive substances for testing in order to put them into contact with the contents of the device 1 while said contents are passing through the chamber $C_9$. The accessory 17, shown in FIG. 5, has a perforated basket 170 that is removable and that is suitable for containing substances for testing in solid form.

The shape of the accessory 17, in particular the configuration, the number, and the size(s) of the holes in the basket 170, can differ from what is shown in FIG. 5.

A stopper 19 removably closes off the top of the basket 170. The accessory 17 is dimensioned in such a manner that, once positioned in the orifice 18, the stopper 19 closes off the orifice 18 in gastight manner. Only the basket 170 projects into the chamber $C_9$, thereby putting the substance for testing into contact with the contents of the device 1.

The additional unit 9 is adapted to be easy to mount on the device 1 and to be removed therefrom. For this purpose, it suffices to remove the plates 4a, 4b of the chamber $C_2$, the sleeve 2, the corresponding rods 5, and the flange plate 20.

In the configuration without a chamber $C_9$, as shown in FIGS. 7 and 8, provision is not made to incorporate a substance for testing during the operating cycle of the device otherwise than via the orifice 12, or possibly via the inlet connector tubes 13, 14, and 15. The substance is then incorporated directly into the contents of the device. Naturally, it is possible to perform digestion simulation cycles while the unit 9 and the accessory 17 are present in the device 1 without injecting any substance for testing into the accessory 17.

When it is desired to test liquid substances, such substances can be inserted into the device at any time during the operating cycle of the device, via one of the orifices provided in the main unit 8, e.g. via the orifices 13, 14, or 15. It is also possible to incorporate the liquid substance for testing directly into the food bolus on initially filling the device 1.

In another embodiment (not shown), the accessory 17 comprises a permeable pouch suitable for receiving a liquid for testing. In all cases, the accessory 17 is adapted to the substance for testing.

The contents of the device are kept up to temperature by heater films 25 disposed at the sleeves 2, 3 on the outside faces thereof. Each of said films is provided with a heater resistive wire. In the embodiment shown, said films are transparent, thereby enabling it to continue to be possible to see inside the chambers $C_2$, $C_3$. In a variant, the films are opaque and adapted so that it continues to be possible to see inside the compression chambers, e.g. via cutouts provided in the film.

In an embodiment that is not shown, the main unit 8, optionally the flange 20, and/or the additional unit 9 are positioned on a support, e.g. on a heater cradle.

In another embodiment (not shown), such a thermostatically controlled support also receives the sleeves 2, 3. Under these circumstances, the use of such a support makes it unnecessary to use heater films 25.

In a variant, the entire device 1 is housed inside a thermostatically controlled enclosure.

Insofar as the device 1 is used for simulating physiological or pathological conditions of digestion in a monogastric mammal or in a human being, the following parameters are applied to the device 1, in an operating mode simulating normal digestion:

The temperature of the contents is maintained at a value lying in the range 36° C. to 41° C. to within at least 0.2° C.

The pH of the contents is regulated in the range 1 to 8, in particular by injecting hydrochloric acid via one of the connector tubes 13 to 15.

The device 1 is adapted to receive a food bolus, e.g. made up of water or of mixed food. The food bolus is fed in progressively during a cycle, or all at once before the beginning of the cycle.

In order to feed a food bolus into the device, the pistons $7_2$, $7_3$ are, if necessary, moved apart as the volume of the contents inside the device increases. Conversely, the pistons $7_2$ and $7_3$ progressively move towards each other as the contents decrease, e.g. during tapping, until they return to a predefined position. This variation in the volume of the contents during an operating cycle depends on the inputs of food bolus and/or of gastric secretions, on how long the food bolus dwells in the device 1, and on the tapping that is performed. The inputs, the dwell times, and the tapping of the contents of the device vary as a function of the digestive conditions to be reproduced. The instantaneous volume of contents present in the device 1 can be as large as 600 milliliters (mL).

Reciprocating longitudinal movements of the two pistons $7_2$, $7_3$ take place during an operating cycle of the device 1. The frequency and the speed of this back-and-forth movement of the pistons $7_2$, $7_3$ are adjustable. By means of this movement of the pistons, which movement may be synchronous or asynchronous, the food bolus is caused to move from one compression chamber $C_2$ or $C_3$ to the other compression chamber $C_3$ or $C_2$, through the main chamber $C_8$ and through the closure flange plate 20, and, as applicable, through the additional chamber C9 that are situated between the chambers $C_2$, $C_3$. These movements cause a turbulent flow of the contents throughout the device 1, thereby ensuring that the contents are mixed uniformly and that the solid components of said contents are broken down "unaggressively". In other words, gastric digestion is reproduced satisfactorily and representatively.

Mixing and breaking down the gastric contents can be optimized by the presence of a plurality of closure flange plates, disposed inside the device 1, in particular between the main chamber $C_8$ and a compression chamber $C_2$, $C_3$, or indeed between the chambers $C_8$ and $C_9$. Thus, it is possible to have a set of flange plates that have identical or non-identical orifices and that are used as needed, e.g. depending on the desired reduction in the size of the solid components of the food bolus.

In another embodiment, mixing and breaking down the food bolus can be improved by the presence of pieces or baffles for imparting turbulence, which pieces are disposed in the digestion chamber $C_8$, or in the chambers $C_2$, $C_3$, or indeed in the orifices 202 to 205 in the flange plate 20.

The use of pistons $7_2$, $7_3$ for causing the food bolus to move inside the chambers $C_2$, $C_3$ makes it possible to move the bolus fully and in regular and controlled manner. The stomach tone is thus simulated, and it is thus possible to reproduce representatively what happens during digestion. In addition, the movement of the pistons $7_2$, $7_3$ in their respective sleeves 2, 3, combined with them being positioned in abutment against the respective ends 22, 32 at the end of the digestion cycle, at least limits considerably or even eliminates the presence of dead zones inside the chambers $C_2$, $C_3$. In addition, by a washing-out type of effect, the reciprocating movements of the pistons considerably reduce the amount of undigested residual particles in the chamber $C_8$ whose working volume is in the vicinity of 60 mL.

Advantageously, the device 1 is adapted to studying the behavior of a substance for testing, said substance being injected and/or removed at any time during an operating cycle. Such a substance for testing may, for example, be a compressed tablet, a cachet, a capsule, a paste, or indeed a liquid held by an appropriate device. For this purpose, the additional unit 9 makes it possible to put the contents of the device into contact with the substance for testing that has been placed in the accessory 17, inside the intermediate chamber $C_9$.

With the device 1, it is possible firstly, to monitor changes in the food bolus visually through the sleeves 2, 3, and secondly to take samples of the contents of the device via the orifice 10c.

The invention claimed is:

1. A device for simulating a stomach of a monogastric mammal or of a human being, which device comprises at least two compression chambers that are connected together via an intermediate chamber, said device being characterized in that each compression chamber has a piston adapted to push the contents of one compression chamber towards the other compression chamber, and in that it further comprises means suitable for causing the contents of the device to flow in a turbulent flow on passing through an intermediate chamber provided in an intermediate unit equipped with at least one access means giving access to the intermediate chamber and making it possible for substances to be fed into the device and/or to be tapped therefrom at any time during the operating cycle of said device.

2. A device according to claim 1, characterized in that each piston is mounted to move in a direction parallel to a longitudinal axis that is common to the two compression chambers and forms a moving end-wall for each chamber.

3. A device according to claim 1, characterized in that the intermediate chamber comprises two cavities of different shapes and dimensions.

4. A device according to claim 3, characterized in that a first cavity is cylindrical and of circular cross-section, and a second cavity is L-shaped, one branch of the L-shape being connected to the first cavity (80) and the other branch not opening out into the compression chambers when the device is operating normally.

5. A device according to claim 1, characterized in that the means suitable for causing the turbulent flow comprise at least one closure flange plate mounted between one end of a compression chamber and one end of the intermediate chamber.

6. A device according to claim 5, characterized in that the flange plate is provided with at least one calibrated orifice for passing the contents of the device from a compression chamber to the intermediate chamber and vice versa.

7. A device according to claim 6, characterized in that the closure flange plate is disposed in a manner such that its orifices are in register with a cylindrical cavity of the intermediate chamber.

8. A device according to claim 1, characterized in that the intermediate unit is provided with an access orifice enabling a pH and/or temperature probe to be inserted into the intermediate chamber.

9. A device according to claim 1, characterized in that the intermediate unit is provided with an access orifice enabling a pressure sensor to be inserted into the intermediate chamber.

10. A device according to claim 1, characterized in that an additional unit defining an additional chamber suitable for receiving a substance for testing in the device is interposed between the flange plate and the intermediate unit.

11. A device according to claim 10, characterized in that the additional unit defining the additional chamber is interposed removably between the flange plate and the intermediate unit.

12. A device according to claim 10, characterized in that the additional unit is provided with an orifice suitable for receiving an accessory designed to contain a substance for testing.

* * * * *